UNITED STATES PATENT OFFICE.

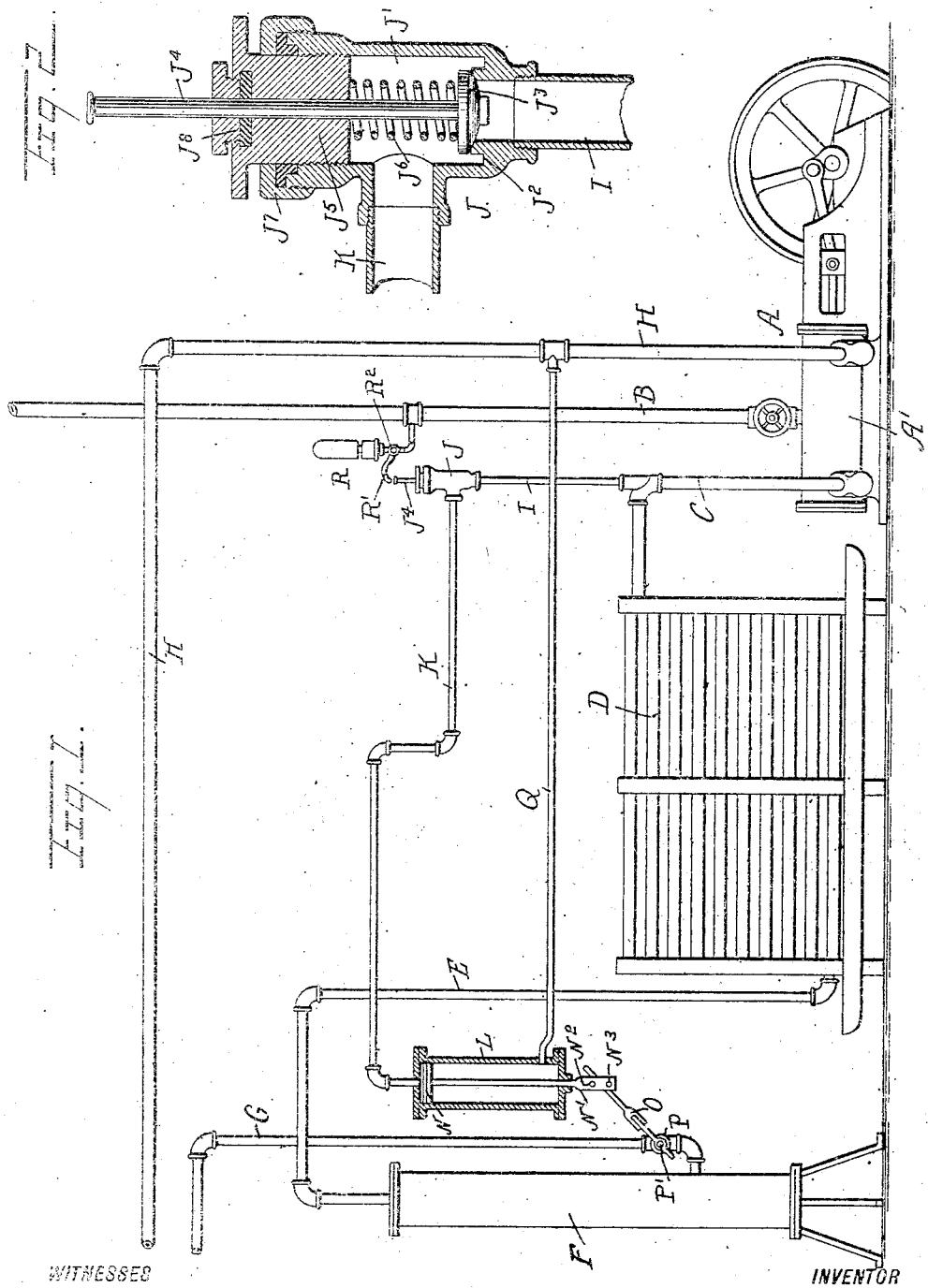

FRITZ A. SCHNEIDER, OF NEW YORK, N. Y.

SAFETY ATTACHMENT FOR COMPRESSION REFRIGERATING APPARATUS.

1,054,456.

Specification of Letters Patent.

Patented Feb. 25, 1913.

Application filed September 18, 1912. Serial No. 720,943.

*To all whom it may concern:*

Be it known that I, FRITZ A. SCHNEIDER, a citizen of the United States, and a resident of the city of New York, borough of the Bronx, in the county and State of New York, have invented a new and Improved Safety Attachment for Compression Refrigerating Apparatus, of which the following is a full, clear, and exact description.

The invention relates to refrigerating and ice-making systems, and its object is to provide a new and improved safety attachment for compression refrigerating apparatus arranged to automatically shut off the ammonia to the expansion coils, and to sound an alarm in case the pressure in the systems exceeds the normal pressure.

In order to accomplish the desired result use is made of means utilizing excess pressure of the ammonia for closing a valve controlling the ammonia to the expansion coils, and for sounding an alarm.

A practical embodiment of the invention is represented in the accompanying drawings forming a part of this specification, in which similar characters of reference indicate corresponding parts in both views.

Figure 1 is a side elevation, partly in section, of the safety attachment for compression refrigerating apparatus; and Fig. 2 is an enlarged sectional side elevation of the relief or controlling valve.

The compressor A of the refrigerator and ice-making system may be of any approved construction, and its steam motor is connected by a steam supply pipe B with a boiler or other source of steam supply for driving the motor and consequently the compressor A. A discharge pipe C leading from the cylinder A' of the compressor A connects in the usual manner with the condenser D connected by a pipe E with a liquid ammonia tank F, to connect by a pipe G with the expansion coils (not shown) and which are connected with the suction pipe H of the cylinder A'.

The ammonia refrigerating and ice-making system so far described is of the usual construction, and the safety attachment is applied to this system in the following manner: The discharge pipe C is connected by a small pipe I with a relief valve J connected by a pipe K with one end of a cylinder L containing a piston N provided with a piston rod N'. The outer end of the piston rod N' is provided with spaced pins $N^2$, $N^3$, between which extends the free end of an arm O attached to the stem P' of a shut-off valve P held in the pipe G, previously mentioned, and connecting the liquid ammonia tank F with the expansion coils. When the system is in use the valve P is opened and the piston N is in the upper end of the cylinder L, as indicated in Fig. 1. The lower portion of the cylinder L is connected by a pipe Q with the suction pipe H of the compressor A, and the arrangement is such that when the piston N moves into a lowermost position, as hereinafter more fully described, it passes the entrance end of the pipe Q into the cylinder L so that the pipes K and Q are connected with each other by the interior of the cylinder L.

The relief valve J is shown in detail in Fig. 2 and is constructed as follows: The body J' of the valve J is provided in its lower portion with a valve seat $J^2$ connected with the pipe I, and on the said valve seat $J^2$ is normally seated a valve $J^3$ having a valve stem $J^4$ mounted to slide in a regulating plug $J^5$ screwing in the upper end of the body J'. A spring $J^6$ is interposed between the valve $J^3$ and the bottom of the plug $J^5$, and the tension of the spring $J^6$ can be increased or diminished by screwing the plug $J^5$ farther down or farther up in the body J'. A packing gland $J^7$ engages the plug $J^5$ and screws on the body J' to render the connection of the plug with the body tight to prevent leakage of gas. A packing gland $J^8$ held on the upper end of the plug $J^5$ engages the stem $J^4$ to prevent leakage of gas by way of the sliding connection of the valve stem $J^4$ in the plug $J^5$. The upper, outer end of the valve stem $J^4$ is adapted to engage the arm R' of a valve $R^2$ of a whistle R or other alarm connected with the steam supply pipe B. It is understood that the valve $J^3$ is held to its seat $J^2$ by the spring $J^6$ against the pressure of the ammonia gas passing through the pipe C, and the spring $J^6$ is adjusted to the normal pressure under which the system is working at the time. Thus as long as the system C is run under normal pressure or below the same the valve $J^3$ remains closed and consequently the pipes I and K are disconnected, but when the pressure in the discharge pipe C increases beyond a normal pressure then the valve $J^3$ opens and connection is made between the pipes I and K.

Presuming that the normal pressure in the pipe C is not to exceed 150 lbs., then in case of an excess pressure in the said pipe C the valve J³ is moved into open position against the tension of the spring J⁶ and ammonia gas now passes from the pipe C by way of the pipe I, valve J and pipe K into the upper end of the cylinder L and forces the piston N downward therein, thus moving the valve P into closed position and thereby shutting off the ammonia from the liquid tank F to the expansion coils. When the piston N has reached its lowermost position it uncovers the entrance end of the pipe Q so that the ammonia gas in the cylinder L can now pass through the pipe Q into the suction pipe H and into the cylinder A′ to increase the load at the suction end of the cylinder A′ to thus tend to reduce the speed of the compressor. When the valve J³ moves into open position, as described, the stem J⁴ acts on the arm R′ so that the valve R² is opened and the whistle R is sounded by steam from the steam supply pipe B, thereby notifying the attendant in charge that the system had been running under more than normal pressure.

From the foregoing it will be seen that by the arrangement described the ammonia to the expansion coils is shut off, and an alarm is sounded so that a dangerous explosion or bursting of pipes in the system is avoided, and the attendant is notified to rectify matters.

Having thus described my invention, I claim as new and desire to secure by Letters Patent:

1. In a refrigerating machine, a compressor, delivery and suction conduits connected with the said compressor, a shut-off valve for shutting off the outflowing fluid, a relief valve connected with the said delivery conduit, and a controlling device connected with the said relief valve and with the said shut-off valve to close the latter on excess pressure passing by way of the relief valve to the said controlling device.

2. In a refrigerating machine, a compressor, delivery and suction conduits connected with the compressor, a relief valve connected with the said delivery conduit, a condenser connected with the said delivery conduit, a tank connected with the said condenser and having an outlet provided with a shut-off valve, and a controlling device connected with the said relief valve and with the said shut-off valve.

3. In a refrigerating machine, a compressor, delivery and suction conduits connected with the compressor, a relief valve connected with the said delivery conduit, a condenser connected with the said delivery conduit, a tank connected with the said condenser and having an outlet provided with a shut-off valve, and a cylinder provided with a piston connected with the said shut-off valve, the said cylinder being connected with the said relief valve to allow excess pressure to pass by way of the relief valve into the said cylinder to move the piston therein and to close the said shut-off valve.

4. In a refrigerating machine, a compressor, delivery and suction conduits connected with the compressor, a relief valve connected with the said delivery conduit, a condenser connected with the said delivery conduit, a tank connected with the said condenser and having an outlet provided with a shut-off valve, a cylinder provided with a piston connected with the said shut-off valve, the said cylinder being connected with the said relief valve to allow excess pressure to pass by way of the relief valve into the said cylinder to move the piston therein and to close the said shut-off valve, and a connection between the said cylinder and the said suction conduit, the entrance end of the said connection into the cylinder being adapted to be uncovered by the said piston to connect the delivery and suction conduits with each other.

5. In a refrigerating machine, a compressor, delivery and suction conduits, connected with the compressor, a relief valve connected with the pressure side of the compressor of the system, a cylinder containing a piston and connected at one end with the said valve, and a pipe connecting the other end of the said cylinder with the suction side of the said compressor, the entrance end of the said pipe into the cylinder being adapted to be uncovered by the said piston to connect the cylinder pipes with each other.

6. In a refrigerating machine, a compressor, delivery and suction conduits, connected with the compressor, a relief valve connected with the pressure side of the compressor system, a cylinder containing a piston and connected at one end with the said valve, a shut-off valve in the outgoing pipe of the system and connected with the said piston, and a pipe connecting the other end of the said cylinder with the suction side of the said compressor, the entrance end of the said pipe into the cylinder being adapted to be uncovered by the said piston to connect the cylinder pipes with each other.

In testimony whereof I have signed my name to this specification in the presence of two subscribing witnesses.

FRITZ A. SCHNEIDER.

Witnesses:
 THEO. G. HOSTER,
 PHILIP D. ROLLHAUS.

Copies of this patent may be obtained for five cents each, by addressing the "Commissioner of Patents, Washington, D. C."